(12) United States Patent
Kostakis et al.

(10) Patent No.: US 12,222,950 B2
(45) Date of Patent: Feb. 11, 2025

(54) SEARCH IN A DATA MARKETPLACE

(71) Applicant: Snowflake Inc., Bozeman, MT (US)

(72) Inventors: Orestis Kostakis, Redmond, WA (US); Timur Misirpashaev, West Windsor, NJ (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/085,452

(22) Filed: Dec. 20, 2022

(65) Prior Publication Data

US 2024/0202203 A1 Jun. 20, 2024

(51) Int. Cl.
*G06F 16/24* (2019.01)
*G06F 16/2453* (2019.01)
*G06F 16/2455* (2019.01)
*G06F 16/2457* (2019.01)

(52) U.S. Cl.
CPC .. *G06F 16/24578* (2019.01); *G06F 16/24542* (2019.01); *G06F 16/24564* (2019.01)

(58) Field of Classification Search
CPC ......... G06F 16/24578; G06F 16/24542; G06F 16/24564
USPC .......................................................... 707/718
See application file for complete search history.

(56) References Cited

U.S. PATENT DOCUMENTS

| | | | |
|---|---|---|---|
| 9,183,280 B2 * | 11/2015 | Achuthan | G06F 16/538 |
| 10,798,100 B1 * | 10/2020 | Chu | H04L 63/102 |
| 11,188,584 B1 * | 11/2021 | Allen | G06F 16/345 |
| 11,620,289 B1 * | 4/2023 | Jiang | G06F 16/27 |
| | | | 707/718 |
| 2014/0297630 A1 * | 10/2014 | Cao | G06F 16/9535 |
| | | | 707/728 |
| 2015/0095154 A1 * | 4/2015 | Kannan | G06Q 50/01 |
| | | | 705/14.55 |
| 2015/0100570 A1 * | 4/2015 | Zent | G06F 16/334 |
| | | | 707/723 |
| 2015/0227891 A1 * | 8/2015 | Cohen | G06Q 50/01 |
| | | | 705/321 |
| 2016/0057165 A1 * | 2/2016 | Thakar | H04L 63/1425 |
| | | | 726/24 |
| 2016/0117386 A1 * | 4/2016 | Ajmera | G06F 40/30 |
| | | | 707/740 |
| 2017/0154040 A1 * | 6/2017 | Munemann | G06F 16/93 |
| 2017/0192958 A1 * | 7/2017 | Misra | G06F 40/30 |
| 2018/0268072 A1 * | 9/2018 | Rathod | G06F 16/248 |
| 2018/0329980 A1 * | 11/2018 | Ebrahim | G06F 16/25 |

(Continued)

*Primary Examiner* — Mohammad S Rostami
(74) *Attorney, Agent, or Firm* — Womble Bond Dickinson (US) LLP

(57) ABSTRACT

A search engine of a data exchange may receive from a user, a query comprising a set of search terms, and retrieve a set of data listings based on the search terms of the query. A data ranking module of the search engine may analyze each of the set of retrieved data listings to determine, for each of the set of retrieved data listings, a set of listing-specific signals and a set of external signals. Listing-specific signals may correspond to attributes or characteristics of data/content within a data listing, while external signals may correspond to a measure of activity in the data exchange that involves a data listing. Based on the listing-specific signals and the external signals analyzed for each retrieved data listing, the set of retrieved data listings may be ordered and presented to the user.

21 Claims, 13 Drawing Sheets

(56) References Cited

U.S. PATENT DOCUMENTS

| | | | |
|---|---|---|---|
| 2019/0147085 A1* | 5/2019 | Pal | G06F 16/24542 |
| | | | 707/718 |
| 2019/0236194 A1* | 8/2019 | James | G06F 16/24542 |
| 2019/0385089 A1* | 12/2019 | Saha | G06N 20/00 |
| 2020/0104731 A1* | 4/2020 | Oliner | G06F 16/248 |
| 2020/0226143 A1* | 7/2020 | Miller | G06F 16/24578 |
| 2021/0081439 A1* | 3/2021 | Glickman | G06F 9/5005 |
| 2021/0084104 A1* | 3/2021 | Glickman | H04L 63/105 |
| 2021/0216983 A1* | 7/2021 | Glickman | G06Q 20/127 |
| 2021/0250400 A1* | 8/2021 | Chu | H04L 63/102 |
| 2022/0237192 A1* | 7/2022 | Jiang | G06F 16/278 |
| 2022/0309557 A1* | 9/2022 | Donnels | G06Q 30/0641 |
| 2023/0214707 A1* | 7/2023 | Sewak | G06F 16/285 |
| | | | 706/12 |
| 2023/0326358 A1* | 10/2023 | Ramos | G09B 5/04 |

* cited by examiner

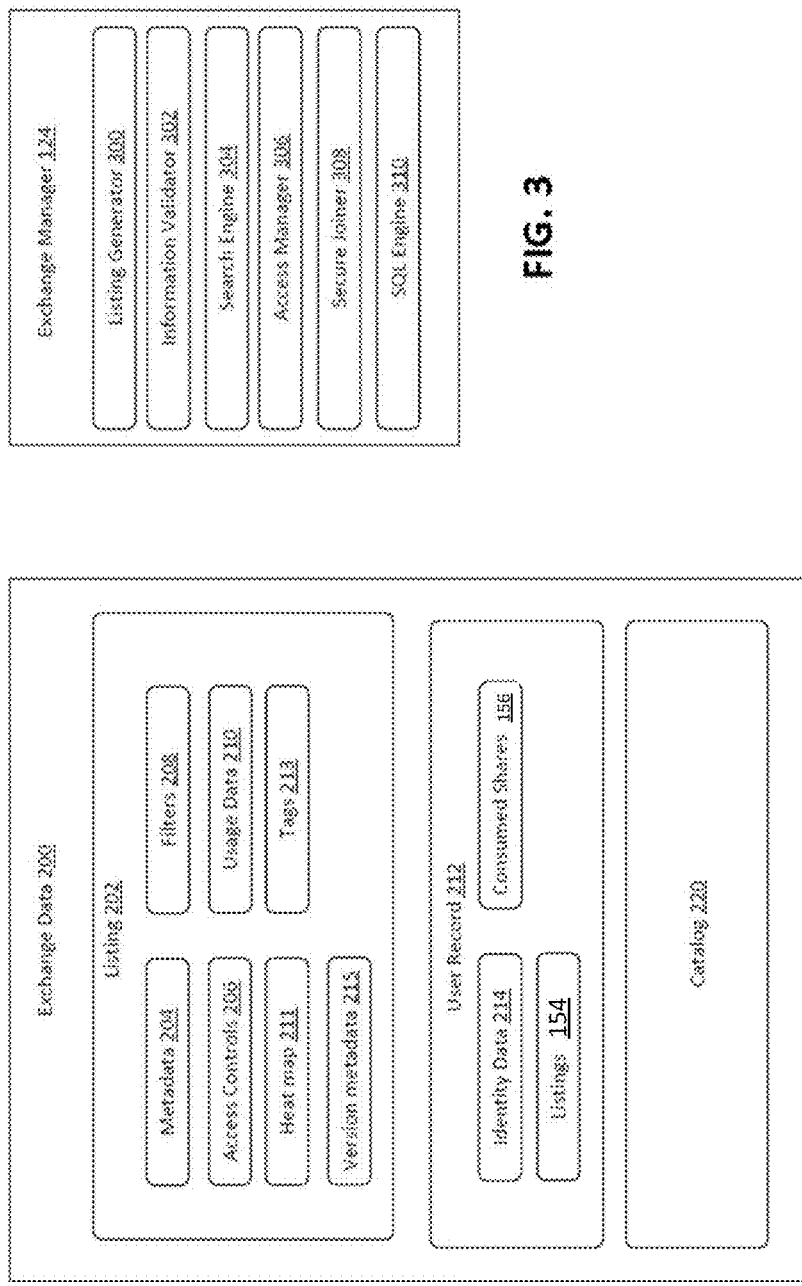

ECONOMY DATA ATLAS
KNOEMA

THE ECONOMY DATA ATLAS GIVES YOU A LOOK AT ECONOMIC AND FINANCIAL DEVELOPMENTS AND MACROECONOMIC INDICATORS THAT HELP SHAPE MARKET TRENDS, INCLUDING ECONOMIC OUTLOOKS, NATIONAL ACCOUNTS, LABOR MARKET, BALANCE OF PAYMENTS, FOREIGN DIRECT INVESTMENT, SHORT TERM, AND LEADING INDICATORS, PRODUCTIVITY, GOVERNMENT FINANCE, EXCHANGE RATES, AND COMMODITY PRICES.

TOPICS COVERED:
- NATIONAL ACCOUNTS
- FINANCIAL SECTOR
- ECONOMIC OUTLOOK
- LABOR MARKET
- PRICES
- SHORT-TERM AND LEADING INDICATORS
- BALANCE OF PAYMENTS (SHOW MORE ⌄)

BUSINESS NEEDS    VIEW ALL OBJECTS

QUANTITATIVE ANALYSIS
THE KNOEMA ECONOMY DATA ATLAS PROVIDES DATA FOR MACROECONOMIC ANALYSIS, MODELING, AND FORECASTING FOR MORE THAN 200 ECONOMIES.

DATA DICTIONARY

(DATASETS) (DATA_ATLAS) (AB~DBMFW4A)
(BNABOP2021) (BEANIPA)

THIS IS A REFERENCE TABLE THAT INCLUDES THE LIST OF ALL TABLES/DATASETS INCLUDED IN THIS LISTING, WITH KEY DETAILS ON EACH TABLE/DATASET INCLUDING NAME, SOURCE, FREQUENCY OF REFRESH, SOURCE, DOCUMENTATION ON DATA, ETC.

| NAME | TYPE | DESCRIPTION |
|---|---|---|
| DATASETID | AA VARCAR | — |
| DATASETNAME | AA VARCAR | — |
| FREQUENCIES | DATE | — |
| FIRSTDATE | DATE | — |
| LASTDATE | DATE | — |
| PUBLICATIONDATE | DATE | — |
| LASTUPDATEDATE | DATE | — |
| NEXT RELEASE DATE | DATE | — |
| URL | AA VARCAR | — |
| SOURCE | AA VARCAR | — |

(SHOW ALL COLUMNS ⌄)

---

FREE
✓ UNLIMITED ACCESS
GET

COMMERCE

? HELP
CONTACT KNOEMA ↗
DOCUMENTATION ↗
SUPPORT ↗

↻ REFRESHES
HOURLY

TIME COVERAGE
NEXT 6 MONTHS
BY WEEK

GEOGRAPHIC COVERAGE
GLOBAL
BY COUNTY

ABOUT KNOEMA
KNOEMA IS THE MOST COMPREHENSIVE SOURCE OF GLOBAL DECISION-MAKING DATA IN THE WORLD. OUR DATA...

(SHOW MORE ⌄)

*FIG. 8*

SEARCH IN A DATA MARKETPLACE

TECHNICAL FIELD

The present disclosure relates to data sharing platforms, and particularly to searching and ranking data sets within a data sharing platform.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a schematic block diagram of data that may be used to implement a public or private data exchange, in accordance with some embodiments of the present invention.

FIG. 3 is a block diagram of a data exchange manager, in accordance with some embodiments of the present disclosure.

FIG. 4B illustrates an interface providing a search and ranking function for data listings, in accordance with some embodiments of the present disclosure.

FIGS. 5A-5C illustrate analysis of listing-specific signals of data listings during a search and ranking process, in accordance with some embodiments of the present invention.

FIG. 8 is a diagram of a data listing with a data dictionary, in accordance with some embodiments of the present invention.

DETAILED DESCRIPTION

Figure 1A:
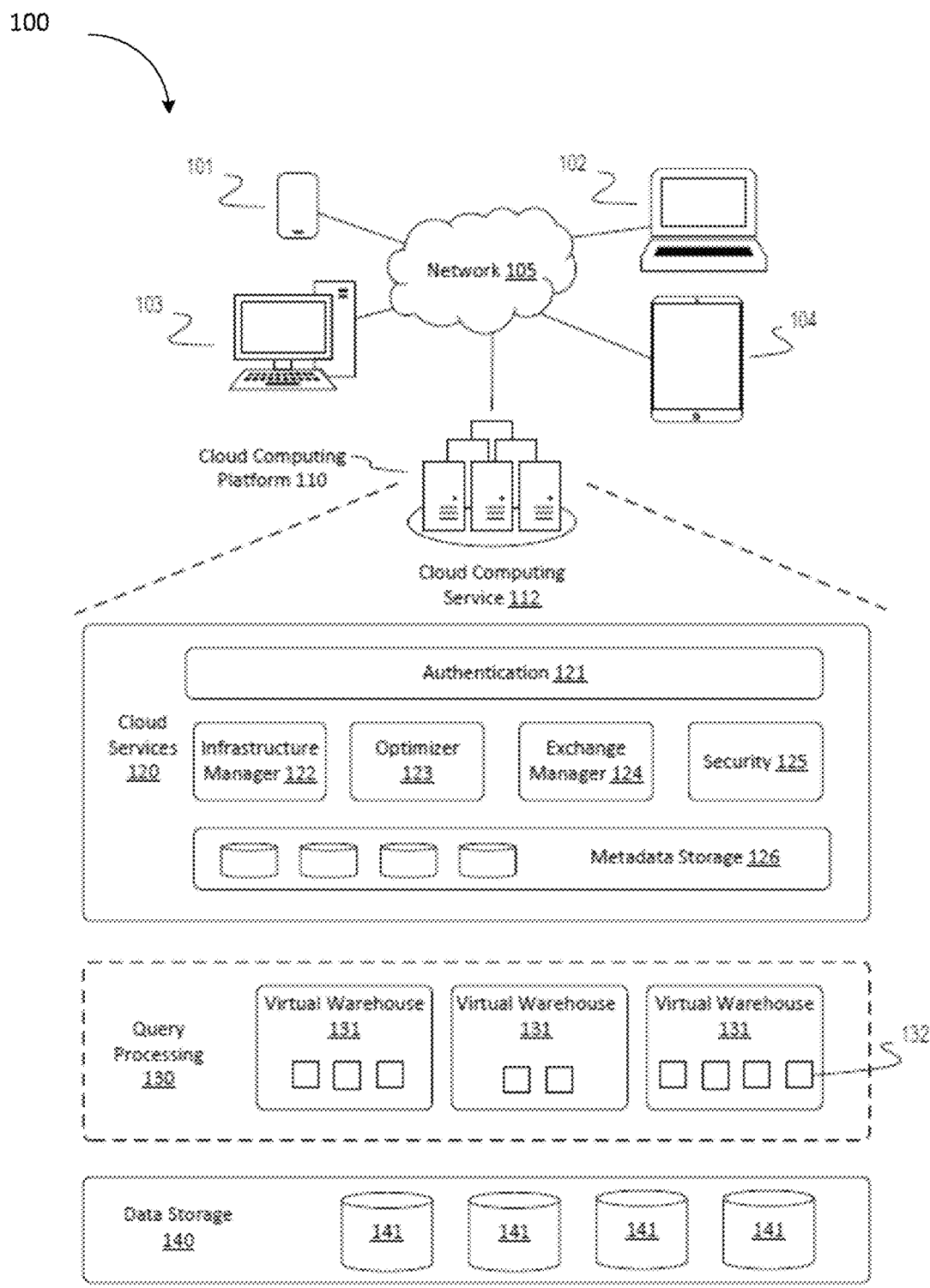
FIG. 1A is a block diagram depicting an example computing environment in which the methods disclosed herein may be implemented, in accordance with some embodiments of the present invention.

Data providers often have data assets that are cumbersome to share, but of interest to another entity. For example, a large online retail company may have a data set that includes the purchasing habits of millions of consumers over the last ten years. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, more nimble cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of consumers. A private data exchange (also referred to herein as a "data exchange") may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as the SNOWFLAKE™ cloud computing service, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities, thus becoming a Data Supplier or Data Provider. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. The consumer accounts with which the database and its objects are shared may be indicated by a list of references to those consumer accounts contained within the share object. Only those consumer accounts that are specifically listed in the share object may be allowed to look up, access, and/or import from this share object. By modifying the list of references of other consumer accounts, the share object can be made accessible to more accounts or be restricted to fewer accounts.

Data exchanges typically contain a large number of available data listings. To assist users in navigating the data exchange, and to allow them to find listings that are relevant to them, the data exchange often provides a data listing search and rank capability. The search and rank capability may include a retrieval phase, and a ranking phase. During the retrieval phase, the data exchange may retrieve listings relevant to the user's search/query and ensure that only relevant listings are presented. During the ranking phase, the data exchange may determine the order (priority) in which the retrieved listings are presented to the user (e.g., via a UI or a programmatic interface).

Retrieved listings are often ordered based on either popularity, the date of the listing's addition (i.e., "most recent"), alphabetically based on the data listing titles, or a weighted version of the term frequency-inverse document frequency (TF-IDF) (each of these being a distinct option). The TF-IDF is a numerical statistic that is intended to reflect how important a word is to a document in a collection or corpus, and a TF-IDF analysis may result in a score for individual words in a data listing based on how important that word is. However, the above approaches are limited in the factors they can account for (such as user-specific factors) and thus can often provide a sub-optimal ranking of the retrieved listings.

Embodiments of the present disclosure address the above noted and other problems by providing techniques for ranking retrieved data listings based on what is relevant to both the query and the user by analyzing listing-specific and external signals of retrieved data listings. A search engine of a data exchange may receive (from a user) a query comprising a set of search terms, and retrieve a set of data listings based on the search terms of the query. A data ranking module of the search engine may analyze each of the set of retrieved data listings to determine, for each of the set of retrieved data listings, a set of listing-specific signals and a set of external signals. Listing-specific signals may correspond to attributes or characteristics of data/content within a data listing, while external signals may correspond to a measure of activity in the data exchange that involves a data listing. Based on the listing-specific signals and the external signals analyzed for each retrieved data listing, the set of retrieved data listings may be ordered and presented to the user.

FIG. 1A is a block diagram of an example computing environment 100 in which the systems and methods disclosed herein may be implemented. In particular, a cloud computing platform 110 may be implemented, such as Amazon Web Services™ (AWS), Microsoft Azure™, Google Cloud™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110). The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as Amazon S3™ to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results.

This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
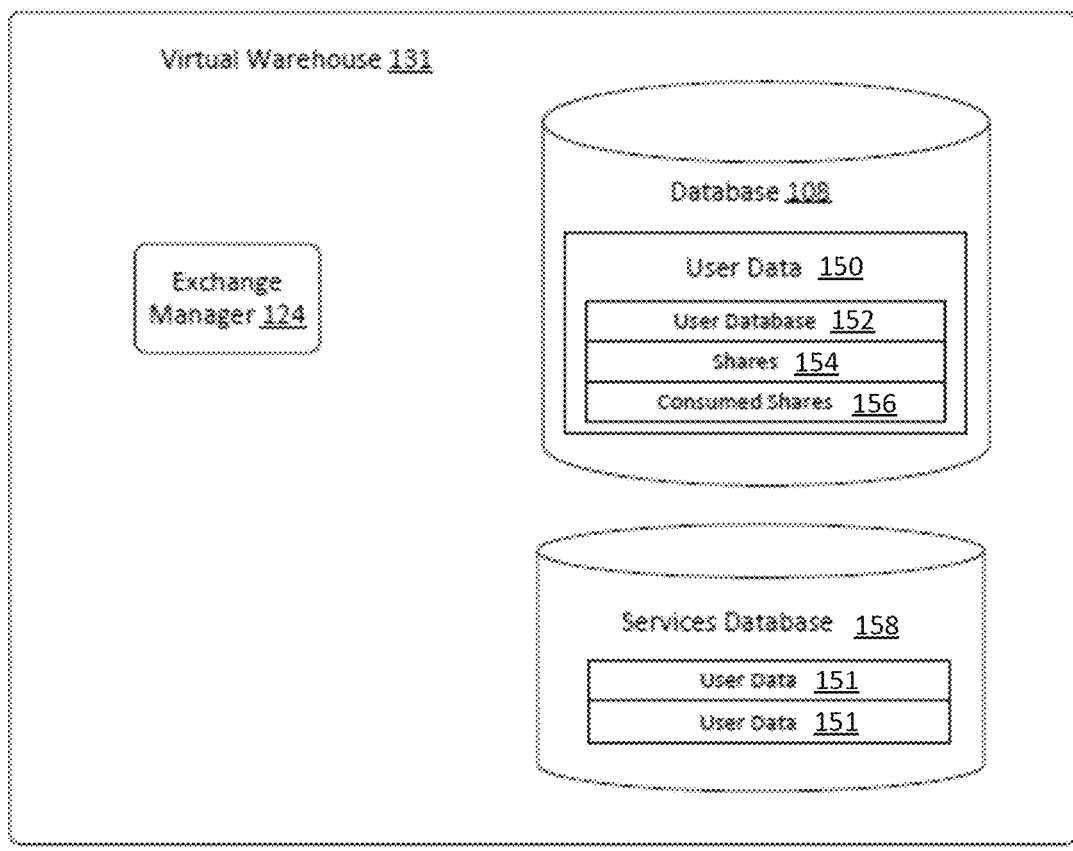
FIG. 1B is a block diagram illustrating an example virtual warehouse, in accordance with some embodiments of the present invention.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g., different enterprises or individuals. The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data.

Using the exchange manager 124, specific data from a user database 152 that is subject to these access controls may be shared with other users in a controlled manner according to the methods disclosed herein. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 28, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

FIG. 2 is a schematic block diagram of data that may be used to implement a public or data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location. The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share in which users may request access but are only allowed access upon approval of the provider. The access controls 206 may specify a set of user identifiers of users that are excluded from being able to access the data referenced by the listing 202.

Note that some listings 202 may be discoverable by users without further authentication or access permissions whereas actual accesses are only permitted after a subsequent authentication step. The access controls 206 may specify that a listing 202 is only discoverable by specific users or classes of users.

Note also that a default function for listings 202 is that the data referenced by the share is not exportable by the consumer. Alternatively, the access controls 206 may specify that this is not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 (also referred to herein as user identifiers) of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 156 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 156 of the user is permitted to access the data referenced by the listing but only a filtered version that only includes data associated with the identifier 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares 156 of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 151 in service database 158 and managed by the virtual warehouse 131.

The user record 212 may list shares associated with the user, e.g., reference listings 154 created by the user. The user record 212 may list shares consumed by the user, e.g. reference listings 202 created by another user and that have been associated to the account of the user according to the methods described herein. For example, a listing 202 may have an identifier that will be used to reference it in the shares or consumed shares 156 of a user record 212.

The listing 202 may also include metadata 204 describing the shared data. The metadata 204 may include some or all of the following information: an identifier of the provider of the shared data, a URL associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The metadata 204 may further include category information indicating a type of the data/service (e.g., location, weather), industry information indicating who uses the data/service (e.g., retail, life sciences), and use case information that indicates how the data/service is used (e.g., supply chain optimization, or risk analysis). For instance, retail consumers may use weather data for supply chain optimization. A use case may refer to a problem that a consumer is solving (i.e., an objective of the consumer) such as supply chain optimization. A use case may be specific to a particular industry, or can apply to multiple industries. Any given data listing (i.e., dataset) can help solve one or more use cases, and hence may be applicable to multiple use cases.

Because use case information relates to how data is used, it can be a powerful tool for organizing/searching for data listings as it allows consumers of the data marketplace to explore and find datasets and services based on industry problems they're trying to solve (e.g., supply chain optimization, audience segmentation). However, providers often describe use cases for data listings in an unstructured format, making it hard for consumers to find them. Because there is no standardized representation for such use case information, it is difficult to create data listing filters based on use case information.

Embodiments of the present disclosure solve the above and other problems by enabling providers to assign use case data to data listings in a structured manner, thereby allowing for data listings to be organized and searched/filtered based on use case information in a more effective manner. A processing device may be used to assign to a first data listing, a set of use cases from a plurality of use cases, each of the set of use cases indicating a manner in which data of the first data listing is used. In order to perform this assigning, the processing device may provide a listing creation interface having selectable indications of each of the plurality of use cases and may receive, via the listing creation interface, a selection of the set of use cases assigned to the first data listing (e.g., from the consumer). The first data listing may be published on the data exchange, wherein the first data listing is one of a plurality of data listings published on the data exchange and the processing device may provide a data listing interface comprising a graphical representation of each of the plurality of data listings; and an interactable menu including a selectable indication of each of the plurality of use cases. In response to receiving a selection of one or more of the plurality of use cases via the interactable menu, the processing device may display in the data listing interface, a graphical representation of each of the plurality of data listings that have been assigned any of the selected one or more use cases. The embodiments described herein make it easy for consumers to browse the data exchange based on their business needs in order to find listings that solve those needs. Embodiments of the present disclosure also enable a data exchange operator to learn about consumers' business needs based on their browsing patterns and querying activities (individual and collective), and further personalize their overall data exchange experience (listing recommendations on worksheets, etc.). It should be noted that a "business need" and a "use case" are used interchangeably herein.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only specified one or more computing platforms 110.

In some embodiments, the catalog 220 is made available on the Internet such that it is searchable by a search engine such as the Bing™ search engine or the Google search engine. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

FIG. 3 illustrates various components 300-310 that may be included in the exchange manager 124. One or more of the components 300-310 may be implemented as a software module (that is executed by a processing device), firmware that is included on a processing device, or in any other appropriate manner. A listing generator 300 may provide an interface for creating listings 202. For example, a webpage interface to the virtual warehouse 131 that enables a user on a device 101-104 to select data, e.g. a specific table in user data 150 of the user, for sharing and enter values defining some or all of the metadata 204, access controls 206, and filters 208. In some embodiments, creation may be performed by a user by way of SQL commands in an SQL interpreter executing on the cloud computing platform 110 and accessed by way of a webpage interface on a user device 101-104.

An information validator 302 may validate information provided by a provider when attempting to create a listing 202. Note that in some embodiments the actions ascribed to the information validator 302 may be performed by a human reviewing the information provided by the provider. In other embodiments, these actions are performed automatically. The information validator 302 may perform, or facilitate performing by a human operator of various functions. These functions may include verifying that the metadata 204 is consistent with the shared data to which it references, verifying that the shared data referenced by metadata 204 is not pirated data, personal identification information (PII), personal health information (PHI) or other data from which sharing is undesirable or illegal. The information validator 302 may also facilitate the verification that the data has been updated within a threshold period of time (e.g., within the last twenty-four hours). The information validator 302 may also facilitate verifying that the data is not static or not available from other static public sources. The information validator 302 may also facilitate verifying that the data is more than merely a sample (e.g., that the data is sufficiently complete to be useful). For example, geographically limited data may be undesirable whereas an aggregation of data that is not otherwise limited may still be of use.

The exchange manager 124 may include a search engine 304. The search engine 304 may implement a webpage interface that is accessible by a user on user devices 101-104 in order to invoke searches for search strings with respect to the metadata in the catalog 220, receive responses to searches, and select references to listings 202 in search results for adding to the consumed shares 156 of the user record 212 of the user performing the search. In some embodiments, searches may be performed by a user by way of SQL commands in an SQL interpreter executing on the cloud computing platform 110 and accessed by way of a webpage interface on user devices 101-104. For example, searching for shares may be performed by way of SQL queries against the catalog 220 within the SQL engine 310 discussed below.

The search engine 304 may further implement a recommendation algorithm. For example, the recommendation algorithm could recommend other listings 202 for a user based on other listings in the user's consumed shares 156 or formerly in the user's consumed shares. Recommendations could be based on logical similarity: one source of weather data leads to a recommendation for a second source of weather data. Recommendations could be based on dissimilarity: one listing is for data in one domain (geographic area, technical field, etc.) results in a listing for a different domain to facilitate complete coverage for the user's analysis (different geographic area, related technical field, etc.).

The exchange manager 124 may include an access manager 306. As described above, a user may add a listing 202. This may require authentication with respect to the provider of the listing 202. Once a listing 202 is added to the consumed shares 156 of the user record 212 of a user, the user may be either (a) required to authenticate each time the data referenced by the listing 202 is accessed or (b) be automatically authenticated and allowed to access the data once the listing 202 is added. The access manager 306 may manage automatic authentication for subsequent access of data in the consumed shares 156 of a user in order to provide seamless access of the shared data as if it was part of the user data 150 of that user. To that end, the access manager 306 may utilize the access controls 206 of the listing 202, certificates, tokens, or other authentication material in order to authenticate the user when performing accesses to shared data.

The exchange manager 124 may include a secure joiner 308. The secure joiner 308 manages the integration of shared data referenced by consumed shares 156 of a user with one another, i.e., shared data from different providers, and with a user database 152 of data owned by the user. In particular, the secure joiner 308 may manage the execution of queries and other computation functions with respect to these various sources of data such that their access is transparent to the user. The secure joiner 308 may further manage the access of data to enforce restrictions on shared data, e.g., such that analysis may be performed and the results of the analysis displayed without exposing the underlying data to the consumer of the data where this restriction is indicated by the access controls 206 of a listing 202.

The exchange manager 124 may further include a standard query language (SQL) engine 310 that is programmed to receive queries from a user and execute the query with respect to data referenced by the query, which may include consumed shares 156 of the user and the user data 150 owned by the user. The SQL engine 310 may perform any query processing functionality known in the art. The SQL engine 310 may additionally or alternatively include any other database management tool or data analysis tool known in the art. The SQL engine 310 may define a webpage interface executing on the cloud computing platform 110 through which SQL queries are input and responses to SQL queries are presented.

Figure 4A:
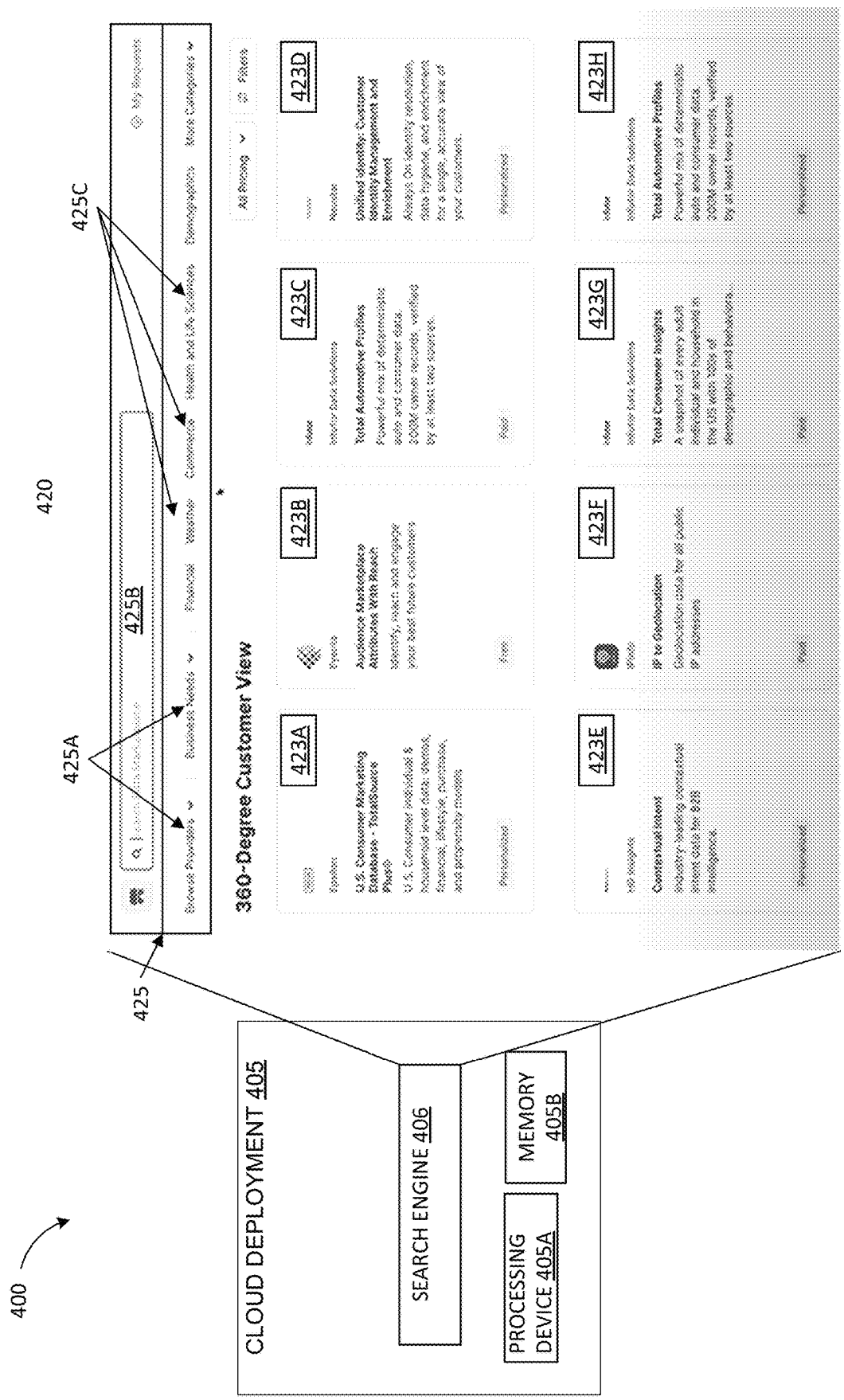
FIG. 4A is a schematic block diagram of deployment of a data exchange where data listing search and ranking techniques are performed, in accordance with some embodiments of the present invention.

FIG. 4A illustrates a cloud environment 400 comprising a cloud deployment 405, which may comprise a similar architecture to cloud computing service 112 (illustrated in FIG. 1A) and may be a deployment of a data exchange or data marketplace. Although illustrated with a single cloud deployment, the cloud environment 400 may have multiple cloud deployments which may be physically located in separate remote geographical regions but may all be deployments of a single data exchange or data marketplace. Although embodiments of the present disclosure are described with respect to a data exchange, this is for example purpose only and the embodiments of the present disclosure may be implemented in any appropriate enterprise database system or data sharing platform where data may be shared among users of the system/platform.

As discussed herein, data that is to be shared via the share object may be represented on the data exchange by a listing as discussed herein with respect to FIG. 2. The deployment 405 may include a search engine 406 which may provide logic and an interface for searching for data listings. FIG. 4A illustrates a data listing interface 420 via which the user may navigate the data exchange and search for/add listings. The interface 420 may be provided by the data exchange when the user logs into the data exchange via e.g., a web browser. As discussed herein, the data exchange may include a plurality of published data listings 423A-423H, and the data listing interface 420 may include interactable representations of each of the published data listings (hereinafter referred to as data listings 423) as well as a listing search and filter feature 425. The listing search and filter feature 425 may include a number of different tools for searching for/filtering through the published data listings 423A-423H including provider drop-down menus 425A (to search for/filter data listings 423 by provider), a keyword search bar 425B (to search for/filter data listings 423 by keyword) and category filters 425C (to search for/filter data listings 423 by category).

Figure 4B:
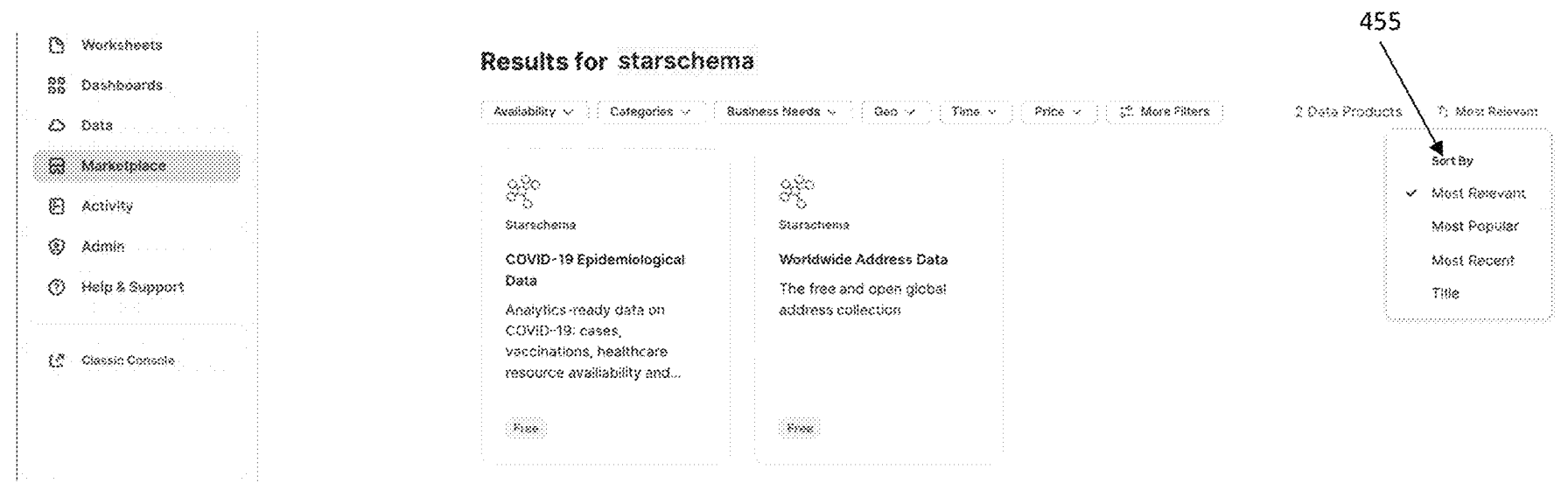

As discussed hereinabove, during the retrieval phase the data exchange may retrieve listings relevant to the user's search/query and ensure that only relevant listings are presented. During the ranking phase, the data exchange may determine the order (priority) in which the retrieved listings are presented to the user (e.g., via a UI or a programmatic interface). Search results are often ranked based on either popularity, the date of the listing's addition (i.e., "most recent"), alphabetically based on the data listing titles, or a weighted version of the term frequency-inverse document frequency (TF-IDF) (each of these being a distinct option). The TF-IDF is a numerical statistic that is intended to reflect how important a word is to a document in a collection or corpus, and a TF-IDF analysis may result in a score for individual words in a data listing based on how important that word is. FIG. 4B illustrates a search interface 450 which may be similar to the data listing interface 420 but may include a sort by drop down menu 455 which includes a number of options that the user can select to rank their retrieved data listings. However, the above approaches are limited in the factors they can account for (such as user-specific factors) and thus can often provide a sub-optimal ranking of the retrieved listings. Thus, embodiments of the present disclosure may provide techniques for ranking retrieved data listings based on what is relevant to both the query and the user by analyzing listing-specific and external signals of retrieved data listings, as discussed in further detail herein. The drop-down menu 455 of FIG. 4B further includes a "Relevance" sort option, selection of which may result in a sorting of retrieved data listings in accordance with some embodiments of the present disclosure.

For example, if a user in the legal field searches for a legal term (e.g., brief) that also has an engineering definition, they should see listings relevant to legal briefs, not engineering briefs.

Figure 5A:
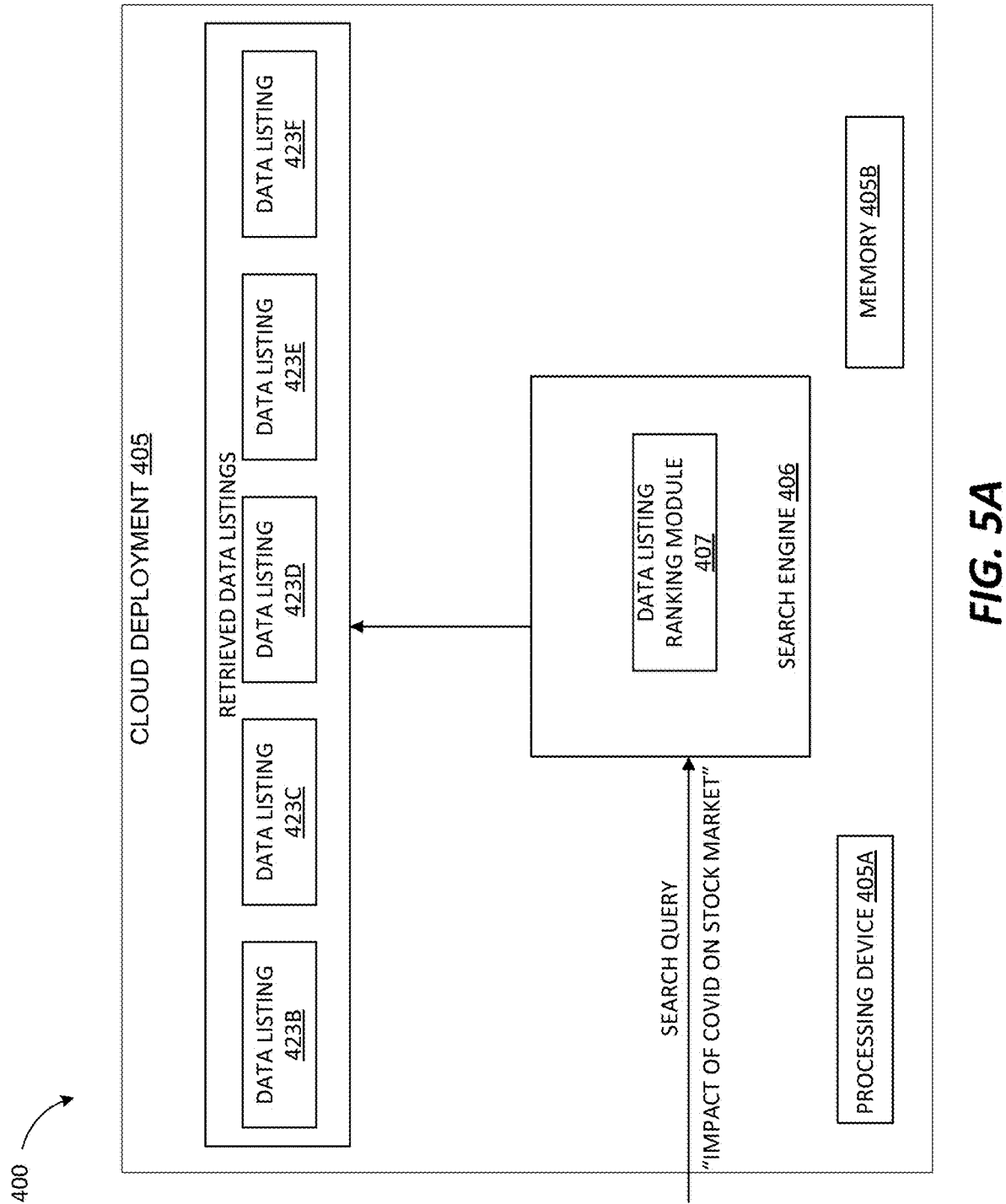

Referring to FIG. 5A, the search engine 406 may include a data listing ranking module 407 which may perform the search and filtering functions described herein. More specifically, the data listing ranking module 407 may provide and order listings that are most relevant to the specific combination of the query and the user by aggregating different input signals during the ranking phase, as described in further detail herein.

The search engine 406 may receive a query consisting of search terms, selections from one or more of the drop-down menus 425A and/or selection of one or more of the category filters 425C. In the example of FIG. 5A, the search engine 406 may receive a query including the search terms "impact of covid on stock market." In response, the search engine 406 may retrieve data listings 423 as it normally would during the search phase to obtain retrieved listings 423B-F as shown in FIG. 5A. Once the listings 423B-F have been retrieved, the search engine 406 may transition to the ranking phase. During the ranking phase, the search engine 406 may execute the data listing ranking module 407, which may consider a number of listing-specific signals as well as a number of external signals for each of the retrieved data listings 423B-F when determining how to rank the retrieved data listings 423B-F. More specifically, the data listing ranking module 407 may analyze each of the retrieved data listings 423B-F to determine a set of listing-specific signals and a set of external signals for each of the retrieved data listings 423B-F.

Each of the listing-specific signals may correspond to attributes or characteristics of data/content within a data listing. Examples of listing-specific signals may include the TF-IDF of each of the search terms over different sections/fields of a data listing, the distance of search terms from each other in the fields of a data listing, the data characteristics of a data listing, and the lexical diversity in each data listing (including e.g., each field of a data listing), among others. Each of the external signals may correspond to a measure of activity in the data exchange that involves a data listing. Examples of external signals may include the popularity score of a data listing, the click-through rate of a data listing, and account or user-specific data, among others.

Each of the listing-specific and external signals may have a weight assigned to them by e.g., an administrator of the data exchange. The data listing ranking module 407 may allow an administrator of the data exchange to determine which listing-specific signals and which external signals should be part of the ranking analysis and assign a weight to each. The data listing ranking module 407 may also allow the administrator to define new signals and assign a weight to them. The data listing ranking module 407 may also allow the administrator to modify the weight assigned to each listing-specific and external signal on the fly. Weights can be assigned based on a variety of factors. One example factor may be the recall-power of a signal. The recall-power of a signal may refer to the uniqueness of the signal. Stated differently, if the determined value for that signal is positive for a particular data listing, this may indicate a rare but concrete scenario and thus the particular data listing should be promoted higher. As a result, an administrator of the data exchange may assign more weight to the signal. Over time, as new data listings are added to the data exchange, the uniqueness of the signal may decrease thus resulting in a situation where irrelevant listings are ranked higher. In this scenario, the weight of the signal may be decreased.

In other cases, the weights might be modified based on the query. If the administrator has identified particular queries as causing adverse or unexpected behavior for specific signals they may opt to modify the weights just for those identified queries. Similarly, if a component of the data listing ranking module 407 that is responsible for computing the value of one or more signals is identified as having a bug or not operating as expected, the administrator of the data exchange may lower or even set the weight of those one or more signals to zero.

In order to rank each of the retrieved data listings 423B-F, the data listing ranking module 407 may determine a ranking score for each of the retrieved data listings 423B-F. Each of the retrieved data listings 423B-F may start with a default ranking score. As the data listing ranking module 407 analyzes each of the listing-specific and external signals for a data listing 423B-F, it may adjust that data listing's score up or down based on the listing-specific and external signals as discussed in further detail herein.

Figure 5B:
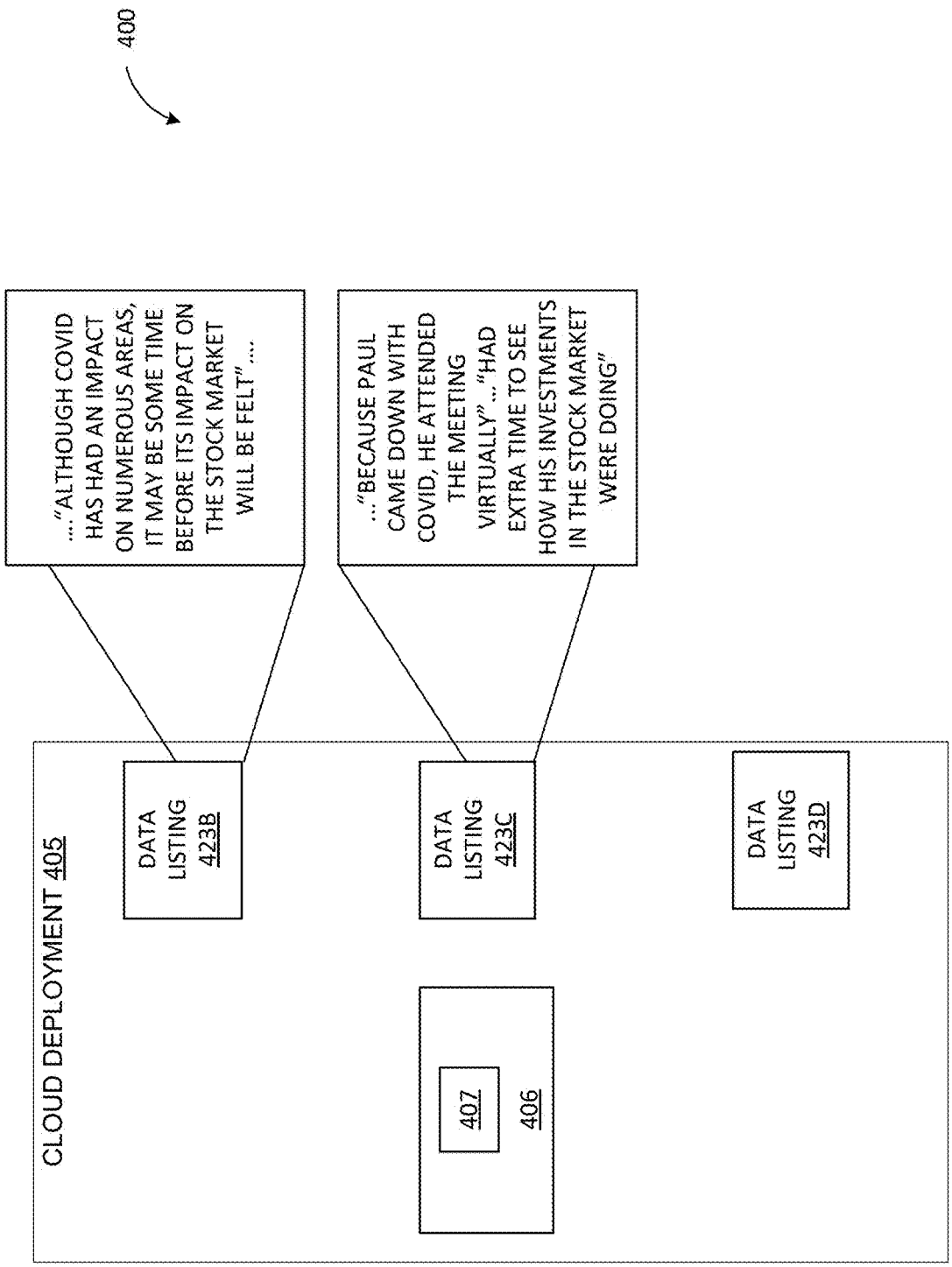
Figure 5C:
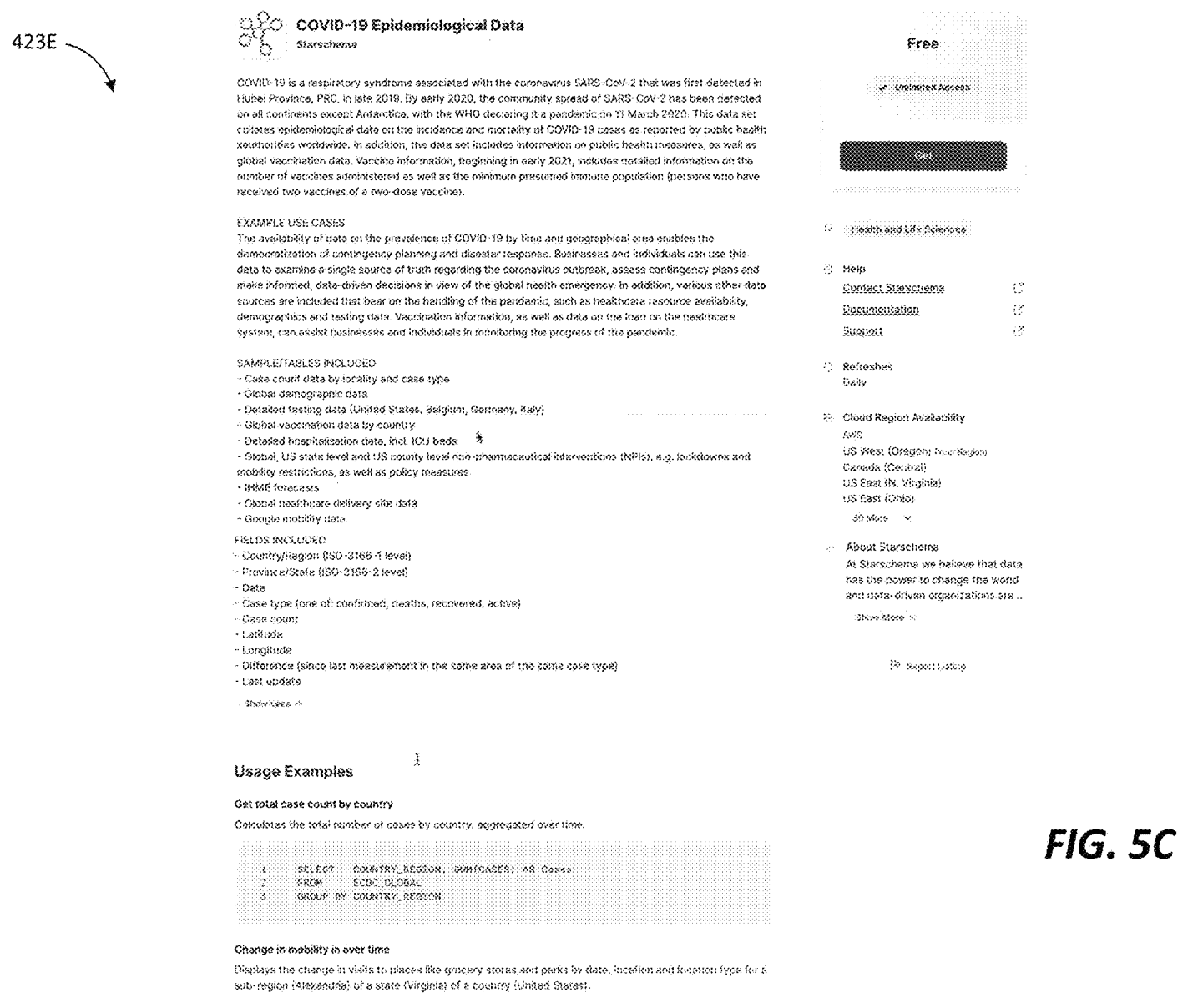

FIGS. 5B and 5C illustrate an example analysis of listing-specific signals and external signals of the retrieved data listings 423B-F in accordance with embodiments of the present disclosure. With respect to TF-IDF, the data listing ranking module 407 may analyze the TF-IDF of each of the search terms over different sections/fields (e.g., title, subtitle, description, provider, etc.) of each of the data listings 423B-F. Based on the weight assigned to the TF-IDF signal, the data listing ranking module 407 may increase the ranking score of data listings 423B-F that have a higher TF-IDF for a larger number of the search terms compared to data listings 423B-F that have a lower TF-IDF for a smaller number of the search terms (for which the data listing ranking module 407 may decrease the ranking score).

The data listing ranking module 407 may also analyze the distance between search terms of the query in the fields of the data listing. For example, because the search terms of the query include the phrase "stock market," the data listing ranking module 407 may increase (based on the weight assigned to the distance between search terms signal) the ranking score of data listings 423B-F where the terms "stock" and "market" are closer to one another in their fields (e.g. "stock market," "stock and derivatives market") compared to other data listings 423B-F where the terms are far apart. Indeed, when terms co-appear in a data listing, the appearance may be incidental if those terms are far apart from each other (e.g., a listing containing real-estate data might have both terms "stock" and "market" mentioned in separate paragraphs, but nothing to do with the stock market). The higher the number of search terms that are proximate to each another (and the more proximate they are to each another), the higher the data listing ranking module 407 will adjust the score of the data listing 423. In some embodiments, a predefined threshold number of words must all be within a predefined proximity threshold of each other in order for the data listing ranking module 407 to increase the ranking score of a data listing. In the example of FIG. 5B, the phrase "although covid has had an impact on numerous areas, it may be some time before its impact on the stock market will be felt" may appear in data listing 423B. The data listing ranking module 407 may significantly increase the ranking score of the data listing 423B based on this because the search terms "covid," "impact," "stock" "market" are all in the same sentence. However, in data listing 423C, although it contains the phrase "stock market," other search terms such as "covid" and "impact" appear far the phrase "stock market," or do not appear at all ("impact"). Thus, the data listing ranking module 407 may only nominally increase the ranking score of data listing 423C, or in some embodiments may not increase it at all.

The data listing ranking module 407 may also analyze the data characteristics of each data listing 423B-F. The data characteristics of a data listing may include the size of the data listing as well as the diversity of the data listing. The diversity of a data listing may refer to the range of values within the data listing as well as the number of distinct values within the data listing. Based on the weight assigned to the data characteristics signal, the search engine 406 may increase the ranking score of data listings 423B-F that are larger in size, have a greater range of values, and/or a greater number of distinct values, as opposed to data listings 423B-F that are smaller in size, have a smaller range of values, and/or have a fewer number of distinct values (which may have their ranking score lowered). Data listing 423D may comprise anonymized healthcare data (not shown) indicating a wide variety of healthcare measurements (e.g., electrocardiogram, blood pressure, cholesterol) over a longer time period for a wide variety of people (e.g., various ages, nationalities, heights, weights, men, women). The data listing ranking module 407 may determine that the data listing 423D has a large size as well as a large range of values and a large number of distinct values and thus increase its ranking score (based on the weight assigned to the data characteristics signal).

The data listing ranking module 407 may also analyze the lexical diversity in each data listing 423B-F, and more specifically in each field of each data listing 423B-F. The lexical diversity may refer to the number of unique words in a field of the data listing divided by the total number of words in the field. As shown in the example of FIG. 5C, the lexical diversity of the "example use cases" field of data listing 423E may be high as there are a large number of unique words in a single paragraph. The data listing ranking module 407 may determine that the data listing 423E has a high degree of lexical diversity and thus increase its ranking score (based on the weight assigned to the lexical diversity signal).

The data listing ranking module 407 may then proceed to analyze the external signals for each of the data listings 423B-F. As discussed hereinabove, external signals of a data listing are not based on the content of the listing itself, but are based on e.g., activity in the data exchange that involves the data listing. The data listing ranking module 407 may analyze a popularity score of each data listing 423B-F, which may be based on multiple aspects including the number of views, the number of installations, the number of times used in jobs (or number of accounts it has been used by). Based on the weight assigned to the popularity score signal, the data listing ranking module 407 may increase the ranking score of a data listing based on its number of views, number of installations, and/or number of times used in jobs.

The data listing ranking module 407 may also analyze the click-through rate of each of the data listings 423B-F. The click-through rate may refer to the number of times a data listing is clicked on in search results divided by the number of times the data listing appears in search results. Based on the weight assigned to the click-through rate signal, the data listing ranking module 407 may increase the ranking score of a data listing the higher its click-through rate, while the data listing ranking module 407 may decrease (based on the weight assigned to the click-through rate signal) the ranking score of a data listing the lower its click-through rate.

The data listing ranking module 407 may also analyze account and/or user-specific data of the account/user who issued the query. Indeed, a company/organization may have an account with the data exchange, but within the company there could be users from different teams (e.g., engineering, marketing) who would each need data listing search results tailored to their specific roles. Thus, account specific data may include company-specific information such as industry, geographical location, and size etc., while user-specific information may include e.g., information related to the professional role of the user who issued the query. The memory 405B may store this information and the data listing ranking module 407 may associate it with the search terms of the query when comparing the search terms to the data of a data listing. For example, if the search terms include the word "inventory," the data listing ranking module 407 may increase the ranking score of data listings 423B-F that are related to inventory associated with the user's professional role as well as inventory related to their company's industry/business-area.

In some embodiments, the data exchange may implement one or more retrieval phase operations in order to optimize the query before retrieving data listings. These retrieval phase operations may modify the search string before all the normal retrieval operations are performed. A first retrieval phase operation may involve term concatenation. Users often put spaces between search terms where spaces do not belong. This occurs frequently with compound nouns and brand names. For example, "Safegraph" and "Starschema," are names that are correctly written as a single word, but are often included in search strings as "Safe graph" and "Star schema" respectively. As a result, search strings including these separated terms result in lookups/data listing retrievals for "safe graph" and "star schema." In order to prevent this, the search engine 406 may concatenate every consecutive group of X words (where X is any appropriate number e.g., 2, 3) and consider each concatenation to be an additional term of the query.

A second retrieval phase operation may involve the use of a secondary query for synonyms. In scenarios where an insufficient number of listings have been returned, the search engine 406 may perform a secondary query with different search terms. These terms replace the original search terms and attempt to capture logical equivalences or other logical, semantic, or topic-related equivalences to the original terms. For example, the search engine 406 may replace "routine" with "function", may replace "atlas" with "geograph", or may replace "Las Vegas" with "Nevada". Since a second query requires additional time, and would result in higher latency for the end-user if run after the original query, in some embodiments the search engine 406 can schedule the second query in parallel to the original query and the results can either be appended to the results for the original query or combined with the results for the original query. The search engine 406 may implement this query term replacement scheme with varying degrees of complexity. For example, the search engine 406 may utilize simple manually curated replacement (lookup) tables, and/or may utilize full-fledged knowledge graphs to implement the query term replacement scheme.

Upon analyzing each of the listing-specific and external signals of each of the data listings 423B-F and adjusting the ranking score of each of the data listings 423B-F, the search engine 406 may rank the data listings 423B-F from highest ranking score to lowest ranking score and display them to the user e.g., via the interface 420. In some embodiments, instead of calculating the ranking score as the analysis of listing-specific and external signals takes place, the determined value(s) for each listing-specific and external signal for a data listing 423B-F may be normalized to a value between zero and one. After the analysis of all listing-specific and external signals takes place, the normalized value of each listing-specific and external signal may be added to generate a ranking score for data listing 423.

In some embodiments, the search engine 406 may include a machine learning (ML) model (not shown). The ML model may be any appropriate model and may over time learn about each account and each individual user, including their search preferences and types of information they tend to seek. Additional examples of information about individual users that the ML model may learn include the type of listings the user tends to click, including the language of the listings' content or the geographic location the contents refer to. In addition, the ML model may learn the user's habits such as whether the user tends to perform identical queries and click on the same result(s) over time, instead of clicking on different results. Once the ML model has built a profile of the user/account, this profile may become one of the external signals used by the data listing ranking module 407 when ordering rankings as discussed herein.

Figure 6:
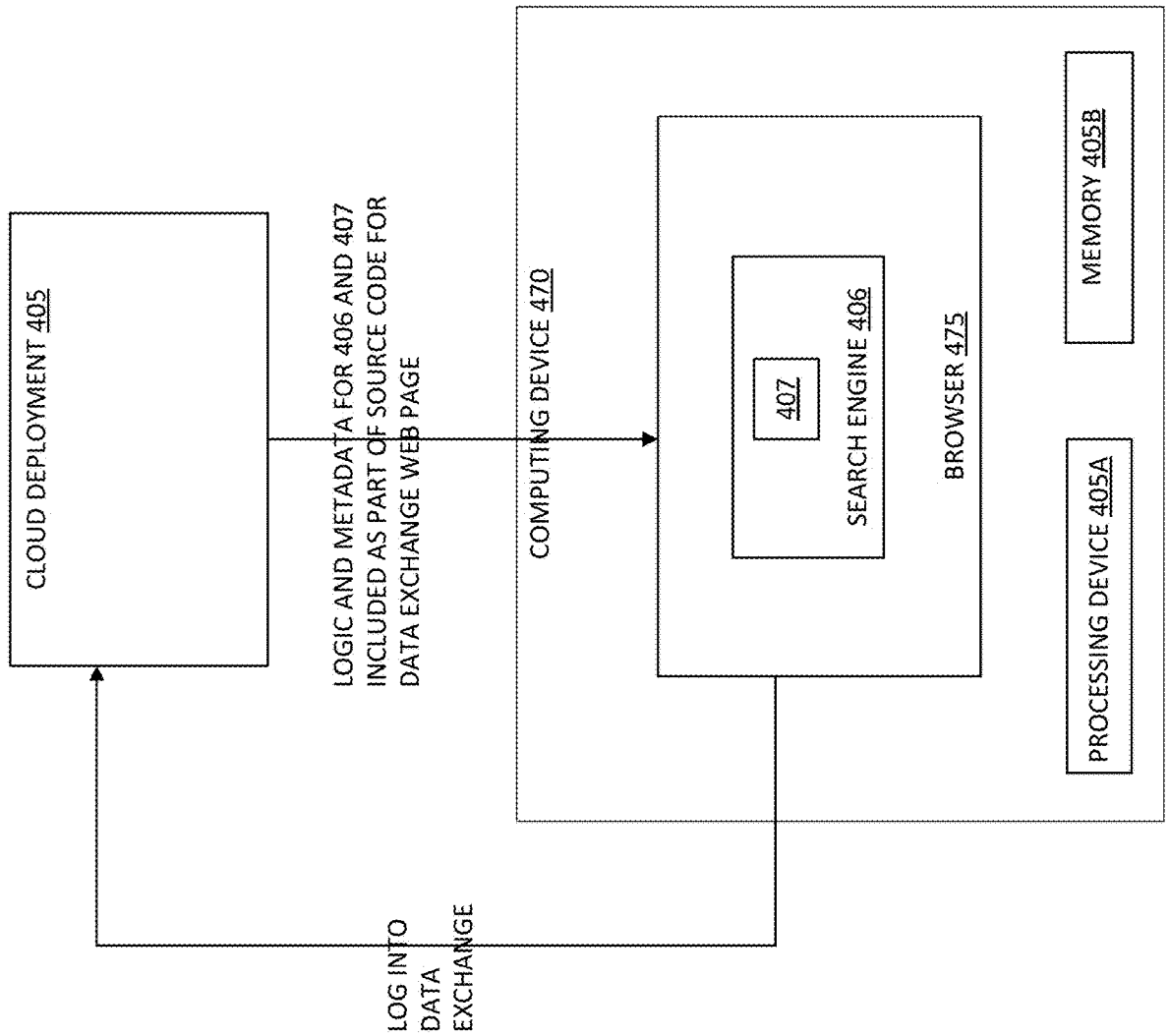
FIG. 6 is a schematic block diagram of data exchange pushing data listing ranking logic to a browser, in accordance with some embodiments of the present invention.

Although the functionality of the data listing ranking module 407 can be implemented on server side as shown in the examples of FIGS. 5A-5C, the functionality of the search engine 406 and the data listing ranking module 407 can also be implemented on the client side. FIG. 6 illustrates an embodiment where the search engine 406 and the data listing ranking module 407 are implemented client side via a web browser 475 implemented on computing device 470, which may be a computing device of a user of the data exchange. More specifically, a user may log into the data exchange via the browser 475, and the content that is downloaded from the data exchange to facilitate the browser experience may include the functionality of the search engine 406 and the data listing ranking module 407. Stated differently, the search engine 406 and the data listing ranking module 407 may be included as part of the source code of the web page. When the user successfully logs into the data exchange, the data exchange may direct the user to a web page (e.g., a data exchange homepage) where the data exchange may furnish all of the necessary logic and metadata for the search engine 406 and the data listing ranking module 407 when loading the web page (e.g. homepage) of the data exchange. Alternatively, the data exchange may furnish all of the necessary logic and metadata for the search engine 406 and the data listing ranking module 407 in response to the user issuing a query. Implementing the search engine 406 and the data listing ranking module 407 locally on the browser 475 provides reduced latency (user-experience and network latency) but may increase the memory footprint/requirements on the user side, as well as remove the need for implementing, maintaining, and scaling the search engine 406 and data listing ranking module 407 infrastructure on the server side. In some embodiments where processing is done client-side, the logic of the search engine 406 and the data listing ranking module 407 may be stored on the browser 475 for future use. For example, the search engine 406 and the data listing ranking module 407 may be stored as a cookie, a temporary file, or any other appropriate file type and may be refreshed (i.e., redownloaded) at regular intervals to ensure the browser 475 is running the most up-to-date version of the search engine 406 and the data listing ranking module 407.

In some embodiments, the data listing ranking techniques described herein may be implemented in whole or in part using data dictionaries. A data dictionary may include metadata describing the shared data provided by a listing overall as well as metadata describing the individual objects included in the shared data, such as the individual tables, schemas, views, functions, and the like. The shared data provided by the listing and each individual data object included in the shared data may be described in the data dictionary by a set of data fields that corresponds to the shared data or the object type of the individual objects. For example, the set of data fields used to describe the listing may include a high-level summary of the shared data provided by the listing, such as the number of schemas, tables, views, functions, and/or stored procedures included in the shared data. Data dictionaries are more fully described in U.S. application Ser. No. 18/051,447, filed Oct. 31, 2022 and entitled "DATA DICTIONARY METADATA FOR MARKETPLACE LISTINGS," which is fully incorporated herein by reference.

The set of data fields used to describe an individual object may provide more specific data about the object and its contents. For example, the set of data fields used to describe a table may include information describing the table (e.g., table name, description, size, number of rows, number of columns), information describing each column in the table (e.g., name, description, data type, example value), column statistics (e.g., ranges of values, frequencies), and table previews. As another example, the set of data fields used to describe a function or stored procedure may include a name of the function or stored procedure, description, parameter names and parameter types.

The metadata populated to the data dictionary can be presented to data consumers along with the description of the listing when requested by data consumers. For example, the metadata populated to the data dictionary can be presented in a user interface along with the description when a data consumer selects to view a listing available through a data exchange. The data provided in the data dictionary provides data consumers with a comprehensive description of the shared data, including a high-level summary of the shared data and description of each individual object included in the shared data. The information included in the data dictionary allows data consumers to understand the contents of the shared data offered by the listing and how to use the shared data provided by the listing.

Figure 7:
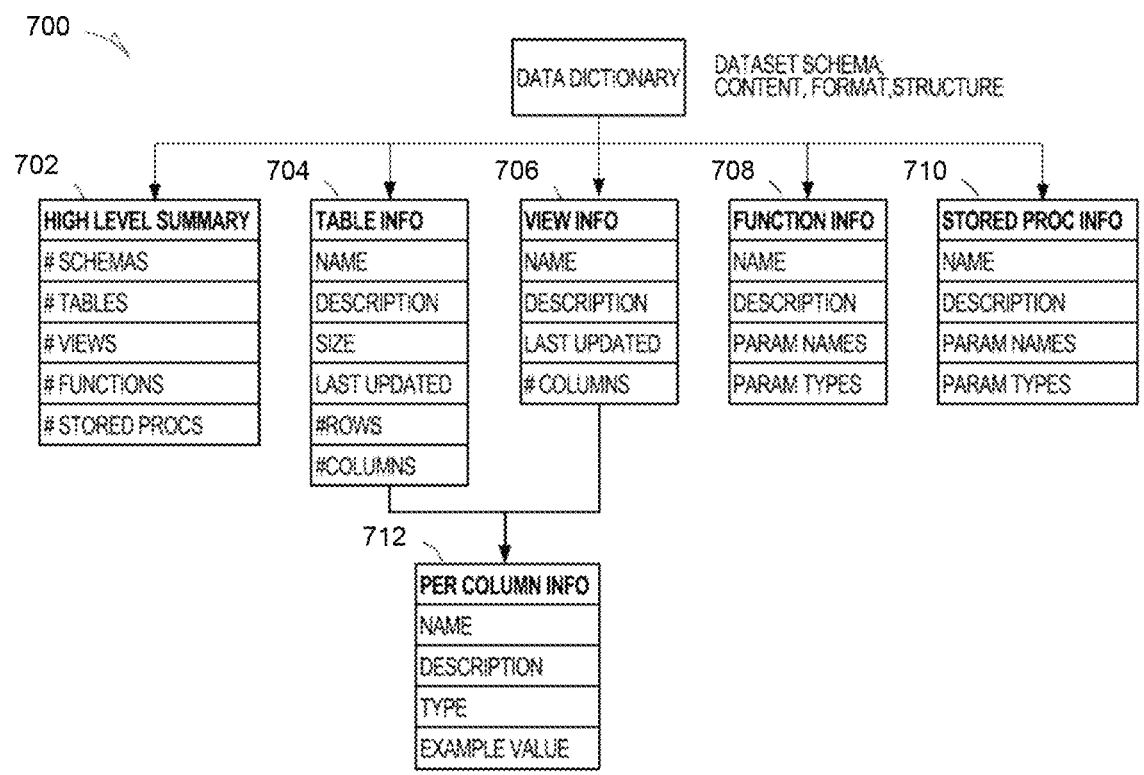
FIG. 7 is a diagram of a data dictionary schema, in accordance with some embodiments of the present invention.

FIG. 7 is a block diagram illustrating a data dictionary schema 700, in accordance with some embodiments of the present invention. As shown, the data dictionary schema 700 includes a high-level summary 702 of the shared data provided by the listing 202, table information 704 describing the tables included in the shared data, view information 706 describing views in the shared data, function information 708 describing functions in the shared data and stored procedure information 710 describing stored procedures in the shared data. Per column information 712 is also provided for each table and view in the shared data. As shown, each of the objects includes a set of data fields. For example, the high-level summary information 702 includes a number of schemas, tables, views, functions and stored procedures in the shared data. The table information 704 includes a name, description, size, last update, number of rows and number of columns in a table. The view information 706 includes a name, description, last update and number of columns in the view. The function information 708 and stored procedure information 710 both include the name, description, parameter names and parameter types of the function or stored procedure. Similarly, the per column information 712 includes a name, description, data value type, and example value for each column included in a table or view.

FIG. 8 is a block diagram of a user interface 800 presenting a description of a listing with a data dictionary, in accordance with some embodiments of the present invention. As shown, the user interface 800 includes a description of the listing 802, including a written description 804 and price 806. Further, the user interface 800 includes a data dictionary 808 generated for the listing. The data dictionary 808 allows a data consumer to view information describing a group of objects included in the shared data, such as tables, views and functions. In some embodiments, a set of featured objects selected by a data provider may be included in the user interface. The user interface 800 also includes a button 810 to view additional columns included in a dataset.

The data exchange may generate a data dictionary for each of the data listings 423 (e.g., as they are created and before any of them are retrieved). When analyzing the listing-specific and external signals for each of the retrieved data listings 423B-F, the data listing ranking module 407 may instead analyze the corresponding data dictionary of the retrieved data listing 423B-F. Data dictionaries provide the benefit of having information about the listing's data contents, such as table-names and per-column information, in a readily available and organized manner. Data dictionaries may also contain most of the information needed to compute values for each of the listing-specific signals discussed above and some of the external signals discussed above as well. Thus, depending on which external signals are being used, a data dictionary may contain all of the information needed to compute values for the listing-specific and external signals that are in use.

Figure 9:
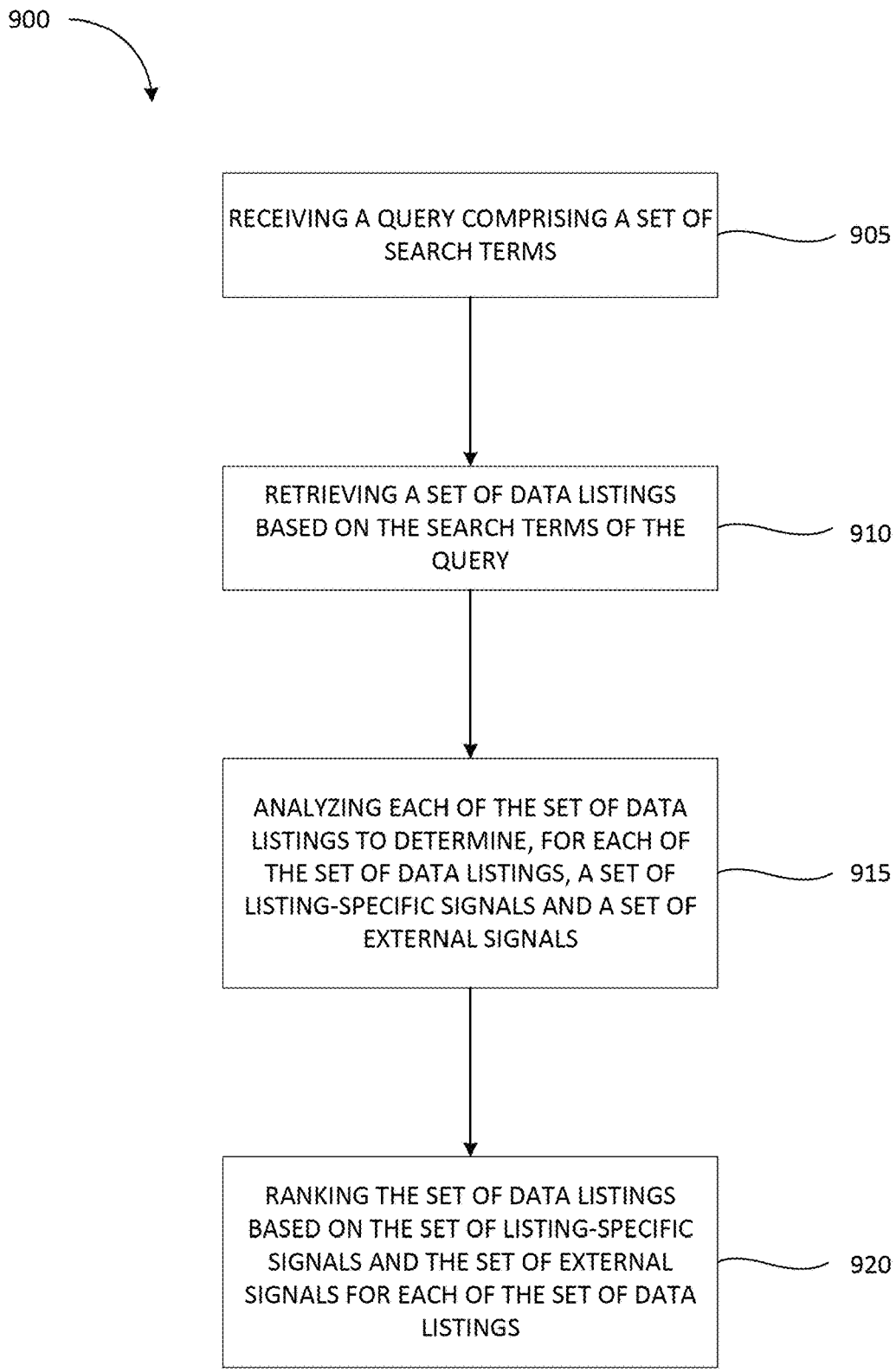
FIG. 9 is a flow diagram of a method for enhanced data listing search and ranking, in accordance with some embodiments of the present invention.

FIG. 9 is a flow diagram of a method 900 for performing an enhanced data listing ranking using listing-specific and external signals, in accordance with some embodiments of the present disclosure. Method 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 900 may be performed by processing device 405A of cloud deployment 405 (illustrated in FIG. 4).

At block 905, the search engine 406 may receive a query consisting of search terms, selections from one or more of the drop-down menus 425A and/or selection of one or more of the category filters 425C. In the example of FIG. 5A, the search engine 406 may receive a query including the search terms "impact of covid on stock market." In response, at block 910, the search engine 406 may retrieve data listings 423 as it normally would during the search phase to obtain retrieved listings 423B-F as shown in FIG. 5A. Once the retrieved listings 423B-F have been retrieved, the search engine 406 may transition to the ranking phase. During the ranking phase, the search engine 406 may execute the data listing ranking module 407, which may consider a number of listing-specific signals as well as a number of external signals for each of the retrieved data listings 423B-F when determining how to rank the retrieved data listings 423B-F. More specifically, at block 915, the data listing ranking module 407 may analyze each of the retrieved data listings 423B-F to determine a set of listing-specific signals and a set of external signals for each of the retrieved data listings 423B-F.

Each of the listing-specific signals may correspond to attributes or characteristics of data/content within a data listing. Examples of listing-specific signals may include the TF-IDF of each of the search terms over different sections/fields of a data listing, the distance of search terms from each other in the fields of a data listing, the data characteristics of a data listing, and the lexical diversity in each data listing (including e.g., each field of a data listing), among others. Each of the external signals may correspond to a measure of activity in the data exchange that involves a data listing. Examples of external signals may include the popularity score of a data listing, the click-through rate of a data listing, and account or user-specific data of a data listing, among others.

Each of the listing-specific and external signals may have a weight assigned to them by e.g., an administrator of the data exchange. The data listing ranking module 407 may allow an administrator of the data exchange to determine which listing-specific signals and which external signals should be part of the ranking analysis and assign a weight to each. The data listing ranking module 407 may also allow the administrator to define new signals and assign a weight to them. The data listing ranking module 407 may also allow the administrator to modify the weight assigned to each listing-specific and external signal on the fly. Weights can be assigned based on a variety of factors. One example factor may be the recall-power of a signal. The recall-power of a signal may refer to the uniqueness of the signal. Stated differently, if the determined value for that signal is positive for a particular data listing, this may indicate a rare but concrete scenario and thus the particular data listing should be promoted higher. As a result, an administrator of the data exchange may assign more weight to the signal. Over time, as new data listings are added to the data exchange, the uniqueness of the signal may decrease thus resulting in a situation where irrelevant listings are ranked higher. In this scenario, the weight of the signal may be decreased.

In other cases, the weights might be modified based on the query. If the administrator has identified particular queries as causing adverse or unexpected behavior for specific signals they may opt to modify the weights just for those identified queries. Similarly, if a component of the data listing ranking module 407 that is responsible for computing the value of one or more signals is identified as having a bug or not operating as expected, the administrator of the data exchange may lower or even set the weight of those one or more signals to zero.

In order to rank each of the retrieved data listings 423B-F, the data listing ranking module 407 may determine a ranking score for each of the retrieved data listings 423B-F. Each of the retrieved data listings 423B-F may start with a default ranking score. As the data listing ranking module 407 analyzes each of the listing-specific and external signals for a data listing 423B-F, it may adjust that data listing's score up or down based on the listing-specific and external signals as discussed in further detail herein.

FIGS. 5B and 5C illustrate an example analysis of listing-specific signals and external signals of the retrieved data listings 423B-F in accordance with embodiments of the present disclosure. With respect to TF-IDF, the data listing ranking module 407 may analyze the TF-IDF of each of the search terms over different sections/fields (e.g., title, subtitle, description, provider, etc.) of each of the data listings 423B-F. Based on the weight assigned to the TF-IDF signal, the data listing ranking module 407 may increase the ranking score of data listings 423B-F that have a higher TF-IDF for a larger number of the search terms compared to data listings 423B-F that have a lower TF-IDF for a smaller number of the search terms (for which the data listing ranking module 407 may decrease the ranking score).

The data listing ranking module 407 may also analyze the distance between search terms of the query in the fields of the data listing. For example, because the search terms of the query include the phrase "stock market," the data listing ranking module 407 may increase (based on the weight assigned to the distance between search terms signal) the ranking score of data listings 423B-F where the terms "stock" and "market" are closer to one another in their fields (e.g. "stock market," "stock and derivatives market") compared to other data listings 423B-F where the terms are far apart. Indeed, when terms co-appear in a data listing, the appearance may be incidental if those terms are far apart from each other (e.g. a listing containing real-estate data might have both terms "stock" and "market" mentioned in separate paragraphs, but nothing to do with the stock market). The higher the number of search terms that are proximate to each another (and the more proximate they are to each another), the higher the data listing ranking module 407 will adjust the score of the data listing 423. In some embodiments, a predefined threshold number of words must all be within a predefined proximity threshold of each other in order for the data listing ranking module 407 to increase the ranking score of a data listing. In the example of FIG. 5B, the phrase "although covid has had an impact on numerous areas, it may be some time before its impact on the stock market will be felt" may appear in data listing 423B. The data listing ranking module 407 may significantly increase the ranking score of the data listing 423B based on this because the search terms "covid," "impact," "stock" "market" are all in the same sentence. However, in data listing 423C, although it contains the phrase "stock market," other search terms such as "covid" and "impact" appear far the phrase "stock market," or do not appear at all ("impact"). Thus, the data listing ranking module 407 may only nominally increase the ranking score of data listing 423C, or in some embodiments may not increase it at all.

The data listing ranking module 407 may also analyze the data characteristics of each data listing 423B-F. The data characteristics of a data listing may include the size of the data listing as well as the diversity of the data listing. The diversity of a data listing may refer to the range of values within the data listing as well as the number of distinct values within the data listing. Based on the weight assigned to the data characteristics signal, the search engine 406 may increase the ranking score of data listings 423B-F that are larger in size, have a greater range of values, and/or a greater number of distinct values, as opposed to data listings 423B-F that are smaller in size, have a smaller range of values, and/or have a fewer number of distinct values (which may have their ranking score lowered). Data listing 423D may comprise anonymized healthcare data (not shown) indicating a wide variety of healthcare measurements (e.g., electrocardiogram, blood pressure, cholesterol) over a longer time period for a wide variety of people (e.g., various ages, nationalities, heights, weights, men, women). The data listing ranking module 407 may determine that the data listing 423D has a large size as well as a large range of values and a large number of distinct values and thus increase its ranking score (based on the weight assigned to the data characteristics signal).

The data listing ranking module 407 may also analyze the lexical diversity in each data listing 423B-F, and more specifically in each field of each data listing 423B-F. The lexical diversity may refer to the number of unique words in a field of the data listing divided by the total number of words in the field. As shown in the example of FIG. 5C, the lexical diversity of the "example use cases" field of data listing 423E may be high as there are a large number of unique words in a single paragraph. The data listing ranking module 407 may determine that the data listing 423E has a high degree of lexical diversity and thus increase its ranking score (based on the weight assigned to the lexical diversity signal).

The data listing ranking module 407 may then proceed to analyze the external signals for each of the data listings 423B-F. As discussed hereinabove, external signals of a data listing are not based on the content of the listing itself, but are based on e.g., activity in the data exchange that involves the data listing. The data listing ranking module 407 may analyze a popularity score of each data listing 423B-F, which may be based on multiple aspects including the number of views, the number of installations, the number of times used in jobs (or number of accounts it has been used by). Based on the weight assigned to the popularity score signal, the data listing ranking module 407 may increase the ranking score of a data listing based on its number of views, number of installations, and/or number of times used in jobs.

The data listing ranking module 407 may also analyze the click-through rate of each of the data listings 423B-F. The click-through rate may refer to the number of times a data listing is clicked on in search results divided by the number of times the data listing appears in search results. Based on the weight assigned to the click-through rate signal, the data listing ranking module 407 may increase the ranking score of a data listing the higher its click-through rate, while the data listing ranking module 407 may decrease (based on the weight assigned to the click-through rate signal) the ranking score of a data listing the lower its click-through rate.

The data listing ranking module 407 may also analyze account and/or user-specific data of the account/user who issued the query. Indeed, a company/organization may have an account with the data exchange, but within the company there could be users from different teams (e.g., engineering, marketing) who would each need data listing search results tailored to their specific roles. Thus, account specific data may include company-specific information such as industry, geographical location, and size etc., while user-specific information may include e.g., information related to the professional role of the user who issued the query. The memory 405B may store this information and the data listing ranking module 407 may associate it with the search terms of the query when comparing the search terms to the data of a data listing. For example, if the search terms include the word "inventory," the data listing ranking module 407 may increase the ranking score of data listings 423B-F that are related to inventory associated with the user's professional role as well as inventory related to their company's industry/business-area.

In some embodiments, the data exchange may implement one or more retrieval phase operations in order to optimize the query before retrieving data listings. These retrieval phase operations may modify the search string before all the normal retrieval operations are performed. A first retrieval phase operation may involve term concatenation. Users often put spaces between search terms where spaces do not belong. This occurs frequently with compound nouns and brand names. For example, "Safegraph" and "Starschema," are names that are correctly written as a single word, but are often included in search strings as "Safe graph" and "Star schema" respectively. As a result, search strings including these separated terms result in lookups/data listing retrievals for "safe graph" and "star schema." In order to prevent this, the search engine 406 may concatenate every consecutive group of X words (where X is any appropriate number e.g., 2, 3) and consider each concatenation to be an additional term of the query.

A second retrieval phase operation may involve the use of a secondary query for synonyms. In scenarios where an insufficient number of listings have been returned, the search engine 406 may perform a secondary query with different search terms. These terms replace the original search terms and attempt to capture logical equivalences or other logical, semantic, or topic-related equivalences to the original terms. For example, the search engine 406 may replace "routine" with "function", may replace "atlas" with "geograph", or may replace "Las Vegas" with "Nevada". Since a second query requires additional time, and would result in higher latency for the end-user if run after the original query, in some embodiments the search engine 406 can schedule the second query in parallel to the original query and the results can either be appended to the results for the original query or combined with the results for the original query. The search engine 406 may implement this query term replacement scheme with varying degrees of complexity. For example, the search engine 406 may utilize simple manually curated replacement (lookup) tables, and/or may utilize full-fledged knowledge graphs to implement the query term replacement scheme.

Upon analyzing each of the listing-specific and external signals of each of the data listings 423B-F, and adjusting the ranking score of each of the data listings 423B-F, at block 920 the search engine 406 may rank the data listings 423B-F from highest ranking score to lowest ranking score and display them to the user e.g., via the interface 420. In some embodiments, instead of calculating the ranking score as the analysis of listing-specific and external signals takes place, the determined value(s) for each listing-specific and external signal for a data listing 423B-F may be normalized to a value between zero and one. After the analysis of all listing-specific and external signals takes place, the normalized value of each listing-specific and external signal may be added to generate a ranking score for data listing 423.

Figure 10:
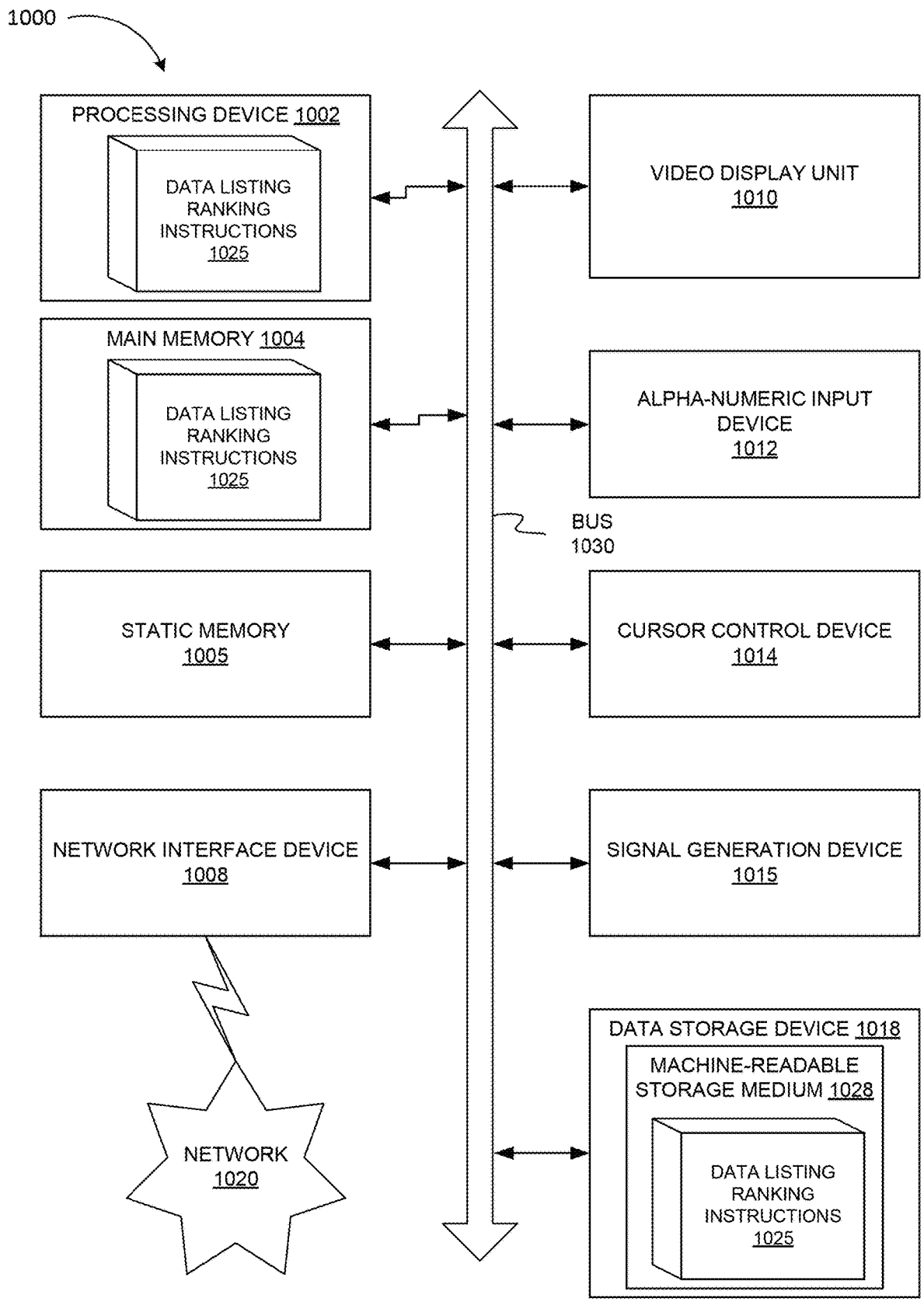
FIG. 10 is a block diagram of an example computing device that may perform one or more of the operations described herein, in accordance with some embodiments of the present invention.

FIG. 10 illustrates a diagrammatic representation of a machine in the example form of a computer system 1000 within which a set of instructions, for ranking retrieved data listings based on what is relevant to both the query and the user by analyzing listing-specific and external signals of retrieved data listings, as discussed in further detail herein.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1000 may be representative of a server.

The exemplary computer system 1000 includes a processing device 1002, a main memory 1004 (e.g., read-only memory (ROM), flash memory, dynamic random access memory (DRAM)), a static memory 1005 (e.g., flash memory, static random access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1015 (e.g., a speaker). In one embodiment, video display unit 1010, alphanumeric input device 1012, and cursor control device 1014 may be combined into a single component or device (e.g., an LCD touch screen).

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute data listing ranking instructions 1025, for performing the operations and steps discussed herein.

The data storage device 1018 may include a machine-readable storage medium 1028, on which is stored one or more sets of data listing ranking instructions 1025 (e.g., software) embodying any one or more of the methodologies of functions described herein. The data listing ranking instructions 1025 may also reside, completely or at least partially, within the main memory 1004 or within the processing device 1002 during execution thereof by the computer system 1000; the main memory 1004 and the processing device 1002 also constituting machine-readable storage media. The data listing ranking instructions 1025 may further be transmitted or received over a network 1020 via the network interface device 1008.

The machine-readable storage medium 1028 may also be used to store instructions to perform the methods described herein. While the machine-readable storage medium 1028 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
generating a data dictionary for each of a set of data listings in a data exchange of a cloud computing platform, the data dictionary for each of the set of data listings comprising:
first metadata describing data shared by a data listing; and
second metadata describing individual objects included in the data shared by the data listing including tables, schemas, views, and functions;
receiving a query comprising a set of search terms;
retrieving the set of data listings in the data exchange of the cloud computing platform based on the set of search terms of the query, wherein the data exchange enables data providers to publish and control access to the set of data listings via share objects;
generating, by a processing device and for each data listing of the set of data listings, a set of listing-specific signals and a set of external signals, wherein each external signal of the set of external signals corresponds to a measure of activity of each data listing of the set of data listings in the data exchange of the cloud computing platform, wherein the set of listing-specific signals comprises a distance of search terms from one another within the data listing;
ranking, by the processing device, the set of data listings based on:
the data dictionary;
a lexical diversity of the set of listing-specific signals, wherein the lexical diversity indicates a number of unique words in fields of the set of data listings divided by a total number of words in the fields, wherein the set of data listings are weighted according to the total number of words in the fields, a range of values, and a number of distinct values;
the set of external signals for each data listing of the set of data listings, comprising a number of views of the data listing;
a professional role of a user issuing the query; and
industry attributes of a company associated with the user; and
presenting, based on the ranking, the set of data listings to a data consumer along with a description of each listing of the set of data listings.

2. The method of claim 1, further comprising:
determining logical, semantic, and topic-related equivalences for each of the set of search terms;

generating a second query using the logical, semantic, and topic-related equivalences for each of the set of search terms; and processing the second query to retrieve additional data listings.

3. The method of claim 1, wherein the set of listing-specific signals comprises one or more of: a term frequency-inverse document frequency (TF-IDF) of each of the set of search terms within the data listing, data characteristics of the data listing, and the lexical diversity.

4. The method of claim 1, wherein the set of external signals comprises one or more of: a popularity score of the data listing, a click-through rate of the data listing, account-specific data corresponding to an account that issued the query, and user-specific data of the user that issued the query.

5. The method of claim 1, further comprising:
receiving, from a browser, a request to load a web page corresponding to the data exchange; and
providing to the browser, as part of the web page, logic for generating the set of listing-specific signals and the set of external signals.

6. The method of claim 1, wherein generating the set of listing-specific signals and the set of external signals comprises:
analyzing the data dictionary for each of the set of data listings.

7. The method of claim 1, further comprising:
presenting the data dictionary to the data consumer.

8. A system comprising:
a memory; and
a processing device operatively coupled to the memory, the processing device to:
generate a data dictionary for each of a set of data listings in a data exchange of a cloud computing platform, the data dictionary for each of the set of data listings comprising:
first metadata describing data shared by a data listing; and
second metadata describing individual objects included in the data shared by the data listing including tables, schemas, views, and functions;
receive a query comprising a set of search terms;
retrieve the set of data listings in the data exchange of the cloud computing platform based on the set of search terms of the query, wherein the data exchange enables data providers to publish and control access to the set of data listings via share objects;
generate, for each of the set of data listings, a set of listing-specific signals and a set of external signals, wherein each external signal of the set of external signals corresponds to a measure of activity of each data listing of the set of data listings in the data exchange of the cloud computing platform;
rank the set of data listings based on:
the data dictionary;
a lexical diversity of the set of listing-specific signals, wherein the lexical diversity indicates a number of unique words in fields of the set of data listings divided by a total number of words in the fields, wherein the set of data listings are weighted according to the total number of words in the fields, a range of values, and a number of distinct values;
the set of external signals for each data listing of the set of data listings, comprising a number of views of the data listing;
a professional role of a user issuing the query; and
industry attributes of a company associated with the user; and
present, based on the ranking, the set of data listings to a data consumer along with a description of each listing of the set of data listings.

9. The system of claim 8, wherein the processing device is further to:
determine logical, semantic, and topic-related equivalences for each of the set of search terms;
generate a second query using the logical, semantic, and topic-related equivalences for each of the set of search terms; and
process the second query to retrieve additional data listings.

10. The system of claim 8, wherein the set of listing-specific signals comprises one or more of: a term frequency-inverse document frequency (TF-IDF) of each of the set of search terms within the data listing, data characteristics of the data listing, and the lexical diversity.

11. The system of claim 8, wherein the set of external signals comprises one or more of: a popularity score of the data listing, a click-through rate of the data listing, account-specific data corresponding to an account that issued the query, and user-specific data of the user that issued the query.

12. The system of claim 8, wherein the processing device is further to:
receive, from a browser, a request to load a web page corresponding to the data exchange; and
provide to the browser, as part of the web page, logic the set of listing-specific signals and the set of external signals.

13. The system of claim 8, wherein to generate the set of listing-specific signals and the set of external signals, the processing device is to:
analyze the data dictionary for each of the set of data listings.

14. The system of claim 8, wherein the processing device is further to:
present the data dictionary to the data consumer.

15. A non-transitory computer-readable medium having instructions stored thereon which, when executed by a processing device, cause the processing device to:
generate a data dictionary for each of a set of data listings in a data exchange of a cloud computing platform, the data dictionary for each of the set of data listings comprising:
first metadata describing data shared by a data listing; and
second metadata describing individual objects included in the data shared by the data listing including tables, schemas, views, and functions;
receive a query comprising a set of search terms;
retrieve the set of data listings in the data exchange of the cloud computing platform based on the set of search terms of the query, wherein the data exchange enables data providers to publish and control access to the set of data listings via share objects;
generate, by the processing device and for each of the set of data listings, a set of listing-specific signals and a set of external signals, wherein each external signal of the set of external signals corresponds to a measure of activity of each data listing of the set of data listings in the data exchange of the cloud computing platform;
rank, by the processing device, the set of data listings based on:
the data dictionary;

a lexical diversity of the set of listing-specific signals, wherein the lexical diversity indicates a number of unique words in fields of the set of data listings divided by a total number of words in the fields, wherein the set of data listings are weighted according to the total number of words in the fields, a range of values, and a number of distinct values;

the set of external signals for each data listing of the set of data listings, comprising a number of views of the data listing;

a professional role of a user issuing the query; and industry attributes of a company associated with the user; and present, based on the ranking, the set of data listings to a data consumer along with a description of each listing of the set of data listings.

16. The non-transitory computer-readable medium of claim 15, wherein the instructions, when executed by the processing device, further cause the processing device to:

determine logical, semantic, and topic-related equivalences for each of the set of search terms;

generate a second query using the logical, semantic, and topic-related equivalences for each of the set of search terms; and process the second query to retrieve additional data listings.

17. The non-transitory computer-readable medium of claim 15, wherein the set of listing-specific signals comprises one or more of: a term frequency-inverse document frequency (TF-IDF) of each of the set of search terms within the data listing, data characteristics of the data listing, and the lexical diversity.

18. The non-transitory computer-readable medium of claim 15, wherein the set of external signals comprises one or more of: a popularity score of the data listing, a click-through rate of the data listing, account-specific data corresponding to an account that issued the query, and user-specific data of the user that issued the query.

19. The non-transitory computer-readable medium of claim 15, wherein the instructions, when executed by the processing device, further cause the processing device to:

receive, from a browser, a request to load a web page corresponding to the data exchange; and provide to the browser, as part of the web page, logic to generate the set of listing-specific signals and the set of external signals.

20. The non-transitory computer-readable medium of claim 15, wherein to generate the set of listing-specific signals and the set of external signals, the instructions, when executed by the processing device, cause the processing device to:

analyze the data dictionary for each of the set of data listings.

21. The non-transitory computer-readable medium of claim 15, wherein the instructions, when executed by the processing device, cause the processing device to:

present the data dictionary to the data consumer.

* * * * *